B. C. SKINNER.
CONVEYING APPARATUS.
APPLICATION FILED MAR. 19, 1921.
1,414,674.
Patented May 2, 1922.
2 SHEETS—SHEET 1.
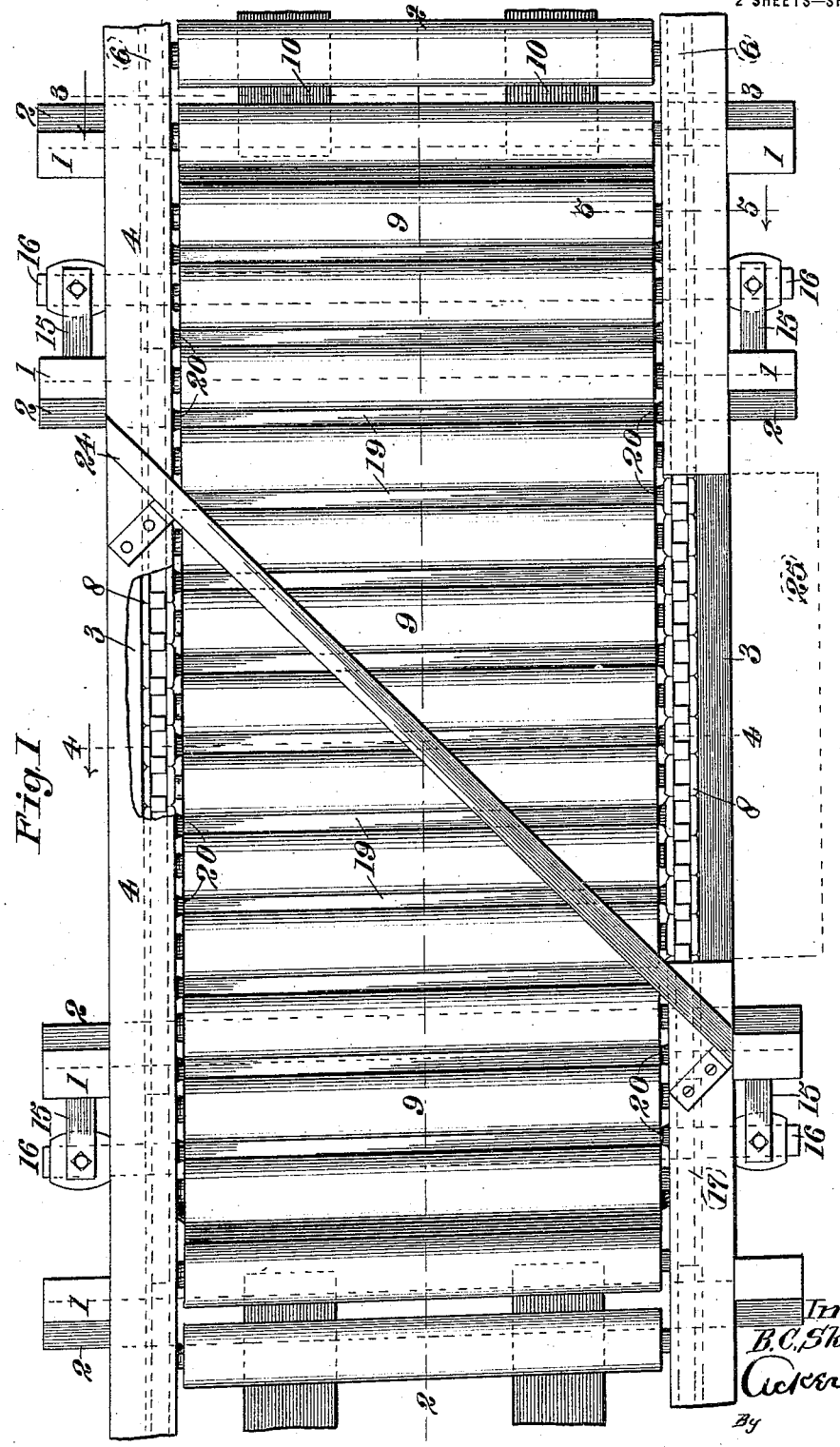

B. C. SKINNER.
CONVEYING APPARATUS.
APPLICATION FILED MAR. 19, 1921.
1,414,674.
Patented May 2, 1922.
2 SHEETS—SHEET 2.
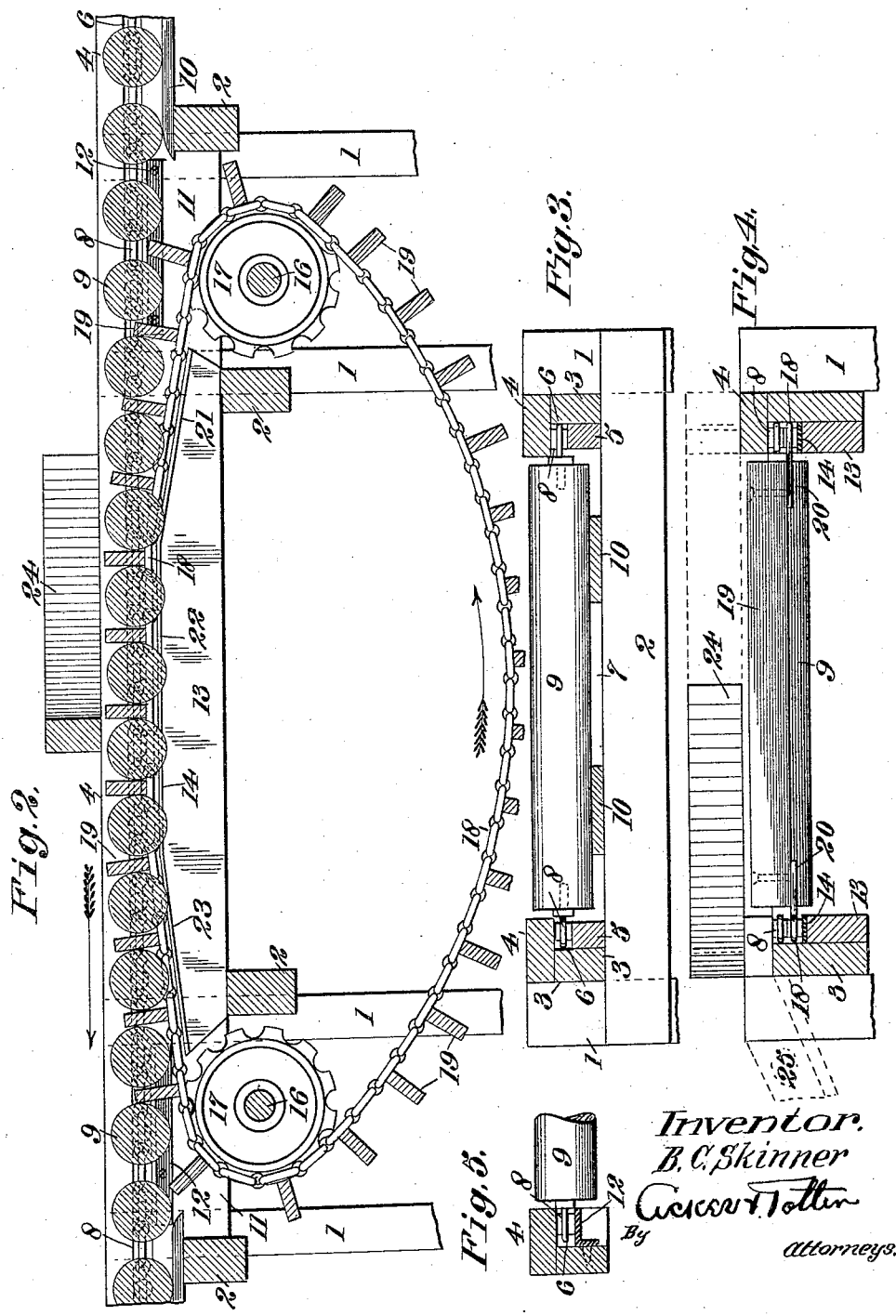
Inventor.
B. C. Skinner

UNITED STATES PATENT OFFICE.

BRONSON C. SKINNER, OF DUNEDIN, FLORIDA, ASSIGNOR TO SKINNER MACHINERY COMPANY, OF DUNEDIN, FLORIDA, A CORPORATION OF FLORIDA.

CONVEYING APPARATUS.

1,414,674.   Specification of Letters Patent.   Patented May 2, 1922.

Application filed March 19, 1921. Serial No. 453,599.

*To all whom it may concern:*

Be it known that I, BRONSON C. SKINNER, a citizen of the United States, residing at Dunedin, in the county of Pinellas and State of Florida, have invented a certain new and useful Improvement in Conveying Apparatus, of which the following is a specification.

It is the present practice in the conveying of fruit particularly in the citrus industry to employ a conveyer of the endless type composed of rotatable spaced conveying rolls between which the fruit rests, and the action of the rolls causing a rotation of the fruit as conveyed. In these constructions, to prevent the pinching and injury of small fruit, it has been the practice to discharge fruit therefrom at the end of the flight.

The present invention relates to a construction for employment in connection with the endless roll conveyers whereby the fruit resting between adjacent rolls is raised from its resting place at one point within the length of travel of the conveyer enabling the fruit to be discharged from the conveyer at one side thereof without the liability of the fruit being injured.

One of the principal objects of this invention is to provide an inexpensive, endless construction positioned beneath a portion of the travel of the main conveyer and operated by the movement of the main conveyer, and which is capable in its operation of inserting or positioning filler pieces or members upwardly between the conveyer rolls for providing a substantially level supporting surface for fruit such as oranges and the like, and to incorporate therewith a directing member disposed transversely of the main conveyer for guiding or directing the fruit transversely of the conveyer to remove the same from the side thereof.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings; wherein:—

Figure 1 is a view in top plan of the preferred embodiment of my invention.

Figure 2 is a longitudinal sectional view taken on line 2—2 of Figure 1.

Figure 3 is a transverse sectional view taken on line 3—3 of Figure 1, viewed in the direction of the arrows.

Figure 4 is a sectional view on line 4—4 of Figure 1 viewed in the direction of the arrows, and Figure 5 is a detail sectional view taken on line 5—5 of Figure 1.

In the drawings wherein like characters of reference designate corresponding parts, the numerals 1 indicate the supports of a conveyer frame connected by the transverse members 2 on which rest parallel side rails 3, which in turn mount a top rail 4 and on the inner side of said side rails 3, beneath the top rails 4 is positioned a supporting track 5, the members 3, 4 and 5 forming a longitudinally disposed guide or slot 6. The slots 6 open at opposite sides of the central runway 7 formed between the inner surface of the tracks 5 and members 4, and in the same are adapted for longitudinal movement endless flexible members or chains 8 connecting the opposite ends of parallel spaced conveyer rolls 9 of a length corresponding to the width of the space 7; said rolls resting on the track 10 which causes a rotation thereof on the movement of the chains in the direction of the arrow Figure 2 of the drawings.

At a point within the length of the conveyer supporting frame, the tracks 10 are interrupted providing an open space 11, and the members 5 are eliminated, the angle irons 12 being substituted therefor for a short distance, as illustrated in Figure 2 of the drawings. Carried by the cross members 2 within the space 11 and disposed parallel with the angle irons 12 and substituted for the members 5 within the open space 11 are suitable guide rails 13 provided with an upper tread surface faced on their upper edges with a wearing strip 14. The ends of the rails 13 are downwardly inclined, and the central upper portion thereof is in a substantially horizontal plane approximately in alignment with the upper surface of the plane of the tracks 10, this being illustrated in Figure 2 of the drawings.

Rotatably supported in brackets 15 carried by the members 1 adjacent the opposite ends of the opening 11 are the transversely disposed shafts 16 mounting adjacent their opposite ends sprockets 17. Around the said sprockets operate the endless chains or other flexible members 18, one positioned adjacent each side of the conveyer frame, and outwardly from said flexible members 18 project suitable conveyer opening filler members 19 disposed in parallel spaced relation at a distance from each other corresponding to the distance between adjacent rolls 9, and said members being of a width corresponding substantially to the diameter of said rolls 9. As illustrated in Figure 4 of the drawings, the members 19 are mounted at their opposite ends on the respective chains 18, through connecting members 20, which permit the chains to lie at slight spaced relation from the ends of the members 19.

It will be observed, particularly from Figures 2 and 4 of the drawings, that the sprockets 17 are mounted below the conveyer rolls 9, and that the chains in travelling up the incline 21 of the rail 13 pass beneath the chains 8, as in Figure 4, causing the gradual insertion or projection of the filler members 19 between the adjacent rolls 9 until the same arrive at the central upper portion 22 when they are fully extended between the rolls and are disposed in an upright position. The incline 23 permits of a gradual removal of the members 19, and these inclines on said rails 13 permit of the employment of relatively small sprockets 17.

It will be observed that power applied to the roll conveyer causes a simultaneous movement of the chains 18 therewith and the automatic insertion and removal of the filler members 19 between adjacent rolls within the open space 11 of the conveyer supporting frame lifting the fruit or conveyed material from between the rolls and permitting the same to be discharged endwise thereof.

A guide board or rail 24 disposed angularly over the upper surface of the endless conveyer at a point above the horizonal portion of the rails 13 directs the fruit or conveyed material elevated from between the rolls by the members 19 longitudinally of the members and rolls and discharges the same transversely of the conveyer.

As illustrated in Figure 1, the top rail 4 adjacent the discharge side of the endless conveyer may if desirable be eliminated and a conveying portion or other suitable member 25 indicated in dotted lines Figure 1 may overlie the chain 8 at the discharge side of the conveyer at this point and protect the material discharged from being injured by contact with said chain.

Having thus described my invention what I claim as new and desire to secure by Letters Patent of the United States is:—

1. An endless conveyer consisting of a flexible propelling member, a plurality of parallel spaced roller conveyers carried thereby, a guide therefor, a plurality of parallel spaced filler members for projecting upwardly between said rollers during a portion of their travel, endless members for mounting and uniting said filler members, an inclined supporting track for causing the gradual movement of said members into and from operative position between said rollers, and a member disposed transversely of the roller conveyer at the point of co-operation therewith of said filler members for moving the material conveyed thereby transversely thereof.

2. An apparatus for raising material from and for substantially filling the spaces between parallel spaced conveying and supporting rollers of an endless conveyer for permitting the ready removal of the material laterally from said conveyer, the same consisting of an endless flexible member, a plurality of filler members carried thereby and projecting therefrom for insertion upwardly between said rollers for a portion of the movement of said conveyer, means for supporting said endless member, and an inclined track for causing the gradual movement of said filler members into and from operative position between said rollers during the movement of the rollers.

3. An apparatus for raising material from and for substantially filling the spaces between parallel spaced conveying and supporting rollers of an endless conveyer for permitting the ready removal of the material laterally from said conveyer at a point within its travel, the same consisting of an endless travelling member positioned beneath a portion of the main conveyer and movable by said conveyer therewith, said endless travelling member provided with a plurality of parallel spaced outwardly projecting filler members adapted on the movement of said conveyer and endless member for insertion within and removal from between said rollers, and a guide track immediately beneath a portion of said endless conveyer and over which a portion of said endless member moves for guiding the filler members between said rollers.

4. An apparatus for raising material from and for substantially filling the spaces between parallel spaced conveying and supporting rollers of an endless conveyer for permitting the ready removal of the material from said conveyer at a point within its travel, the same consisting of an endless travelling member positioned beneath a portion of the main conveyer and movable by said conveyer therewith, said endless travelling member provided with a plurality of parallel spaced outwardly projecting filler members adapted on the movement of said conveyer and endless member for insertion within and removal from between said rollers, a guide track immediately beneath a portion of said endless conveyer and over which a portion of said endless member moves for guiding the filler members between said rollers, and a deflecting board disposed angularly across the conveyer at a point above said guide rail for directing the material thereon longitudinally of said rollers.

5. In combination with an endless travelling conveyer formed of parallel spaced material supporting rollers connected at their ends by endless conveying members, of a supporting frame provided with means for guiding the rollers and for causing the same to rotate during their travel, said frame being interrupted within its length, an endless travelling member beneath the interrupted portion of said frame, a plurality of filler members carried thereby and projecting therefrom in parallel spaced relation, and means for guiding said filler members between said rollers during the movement of the roller conveyer over the interrupted portion of said frame.

6. In combination with an endless travelling conveyer formed of parallel spaced material supporting rollers connected at their ends by endless conveying members, of a supporting frame provided with means for guiding the rollers and for causing the same to rotate during their travel, said frame being interrupted within its length, an endless travelling member beneath the interrupted portion of said frame, a plurality of filler members carried thereby and projecting therefrom in parallel spaced relation, means for guiding said filler members between said rollers during the movement of the roller conveyer over the interrupted portion of said frame, and a guide rail positioned beneath said interrupted portion of the frame and over which said endless travelling member moves, said rail being formed with a relatively flat central upper surface and downwardly inclined portions at opposite ends thereof providing a means for gradually inserting said filler members into and permitting the withdrawal of same from said spaces between said conveying rollers.

7. An apparatus for raising material from and for substantially filling the spaces between parallel spaced conveying and supporting members of an endless conveyer for permitting the ready removal of the material laterally from said conveyer, the same consisting of an endless flexible member, a plurality of filler members carried thereby and projecting therefrom for insertion upwardly between said members for a portion of the movement of said conveyer, means for supporting said endless member, and means for causing the gradual movement of said filler members into and from operative position between said supporting members during the movement of the members.

In testimony whereof I have signed my name to this specification.

BRONSON C. SKINNER.